United States Patent
Zhamu et al.

(10) Patent No.: US 10,734,648 B2
(45) Date of Patent: Aug. 4, 2020

(54) HYBRID LITHIUM ANODE ELECTRODE LAYER AND LITHIUM-ION BATTERY CONTAINING SAME

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 62 days.

(21) Appl. No.: 15/665,606

(22) Filed: Aug. 1, 2017

(65) Prior Publication Data

US 2019/0044137 A1 Feb. 7, 2019

(51) Int. Cl.
*H01M 4/134* (2010.01)
*H01M 4/525* (2010.01)
*H01M 4/485* (2010.01)
*H01M 4/36* (2006.01)
*H01M 4/1395* (2010.01)
*H01M 4/04* (2006.01)
*H01M 4/58* (2010.01)

(52) U.S. Cl.
CPC ......... *H01M 4/525* (2013.01); *H01M 4/0404* (2013.01); *H01M 4/0428* (2013.01); *H01M 4/134* (2013.01); *H01M 4/1395* (2013.01); *H01M 4/366* (2013.01); *H01M 4/485* (2013.01); *H01M 4/5805* (2013.01); *H01M 4/5815* (2013.01)

(58) Field of Classification Search
CPC .............................. H01M 4/382; H01M 4/134
See application file for complete search history.

(56) References Cited

U.S. PATENT DOCUMENTS

| | | |
|---|---|---|
| 4,980,250 A | 12/1990 | Takahashi et al. |
| 5,436,093 A | 7/1995 | Huang et al. |
| 5,601,951 A | 2/1997 | Johnson et al. |
| 5,635,151 A | 6/1997 | Zhang et al. |
| 6,025,093 A | 2/2000 | Herr |

(Continued)

OTHER PUBLICATIONS

PCT/US18/42204 International Search Report and Written Opinion dated Oct. 3, 2018, 8 pages.

(Continued)

*Primary Examiner* — Olatunji A Godo (57) ABSTRACT

Provided is a lithium ion battery that exhibits a significantly improved specific capacity and much longer charge-discharge cycle life. In one preferred embodiment, the battery comprises a cathode, an anode, an electrolyte in ionic contact with both the cathode and the anode, and an optional separator disposed between the cathode and the anode, wherein, prior to the battery being assembled, the anode comprises (a) an anode active material layer composed of fine particles of a first anode active material having an average size from 1 nm to 10 μm, an optional conductive additive, and an optional binder that bonds the fine particles and the conductive additive together to form the anode active material layer having structural integrity and (b) a layer of lithium metal or lithium metal alloy having greater than 80% by weight of lithium therein, wherein the layer of lithium metal or lithium metal alloy is in physical contact with the anode active material layer.

43 Claims, 4 Drawing Sheets (56) References Cited

U.S. PATENT DOCUMENTS

| | | | |
|---|---|---|---|
| 6,335,115 | B1 | 1/2002 | Meissner |
| 6,706,447 | B2 | 3/2004 | Gao et al. |
| 7,276,314 | B2 | 10/2007 | Gao et al. |
| 8,158,282 | B2 | 4/2012 | Zhamu et al. |
| 8,241,793 | B2 | 8/2012 | Zhamu et al. |
| 2005/0130043 | A1 | 6/2005 | Gao et al. |
| 2005/0266304 | A1* | 12/2005 | Honda ............... C25D 1/04 429/128 |
| 2007/0204457 | A1* | 9/2007 | Sato ............... H01M 4/13 29/623.1 |
| 2012/0202112 | A1* | 8/2012 | Yushin ............... H01M 4/38 429/200 |
| 2013/0224603 | A1 | 8/2013 | Chen et al. |
| 2016/0043384 | A1 | 2/2016 | Zhamu et al. |

OTHER PUBLICATIONS

Umeno et al. "Novel Anode Material for Lithium-Ion Batteries: Carbon-coated Silicon Prepared by Thermal Vapor Decomposition" Chemistry Letters (2001) pp. 1186-1187.

* cited by examiner

HYBRID LITHIUM ANODE ELECTRODE LAYER AND LITHIUM-ION BATTERY CONTAINING SAME

FIELD OF THE INVENTION

The present invention provides a secondary battery, particularly a rechargeable lithium-ion battery that comprises an anode containing a layer of anode active material particles and another layer of lithium metal or lithium metal alloy.

BACKGROUND

Concerns over the safety of earlier lithium secondary batteries led to the development of lithium ion secondary batteries, in which pure lithium metal sheet or film was replaced by carbonaceous materials as the negative electrode (anode). The carbonaceous material may comprise primarily graphite that is intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g.

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode active materials has a higher theoretical capacity, e.g., $Li_4Si$ (3.829 mAh/g), $Li_{4.4}Si$ (4.200 mAh/g), $Li_{4.4}Ge$ (1.623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). An anode active material is normally used in a powder form, which is mixed with conductive additives and bonded by a binder resin. The binder also serves to bond the mixture to a current collector. On repeated charge and discharge operations, the alloy particles tend to undergo pulverization and the current collector-supported thin films are prone to fragmentation. Both are due to expansion and contraction of the anode active material during the insertion and extraction of lithium ions. This pulverization or fragmentation results in loss of the particle-to-particle contacts between the active material and the conductive additive or the contact between the anode material and its current collector. These adverse effects result in a significantly shortened charge-discharge cycle life [J. Zhang, et al., "Carbon Electrode Materials for Lithium Battery Cells and Method of Making Same," U.S. Pat. No. 5,635,151 (Jun. 3, 1997)].

To overcome the problems associated with such mechanical degradation, several approaches have been proposed, including (a) using nanoscaled particles of an anode active material, (b) composites composed of small electro-active particles supported by less active or non-active matrices or coatings, and (c) metal alloying. Examples of more promising active particles are Si, Sn, and $SnO_2$. For instance, Umeno, et al. ["Novel Anode Material for Lithium-Ion Batteries: Carbon-coated Silicon Prepared by Thermal Vapor Decomposition," Chemistry Letters, (2001) pp. 1186-1187] proposed an anode based on carbon-coated silicon prepared by thermal vapor decomposition. Although a specific capacity as high as 800-1.450 mAh/g was achieved, the capacity faded rapidly after 40 cycles. In fact, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

The positive electrode (cathode) active material is typically selected from a broad array of lithium-containing or lithium-accommodating oxides, such as lithium manganese dioxide, lithium manganese composite oxide, lithium nickel oxide, lithium cobalt oxide, lithium nickel cobalt oxide, lithium vanadium oxide, and lithium iron phosphate. The cathode active material may also be selected from chalcogen compounds, such as titanium disulfate or molybdenum disulfate, which are initially lithium-free (prior to battery assembly and first charge of the battery). These prior art materials do not offer a high lithium insertion capacity and this capacity also tends to decay rapidly upon repeated charging and discharging. A practical specific capacity of a cathode material has been, at the most, up to 200 mAh/g of the cathode active material, which rapidly decays as the charge-discharge cycling operation proceeds. In many cases, this capacity fading may be ascribed to solid-liquid interface (SEI) formation or cathode-induced electrolyte decomposition. Since the cathode specific capacity is relatively low, there is a strong desire to make use of a cathode active material to its full capacity.

As a lithium-ion cell is charged and discharged, lithium is alternately stored in the cathode and in the anode, so that the total amount of cyclable charge corresponds to the amount of lithium shuttling back and forth between the two electrodes. When the cell is assembled, usually an amount of cathode active material is made to store the amount of lithium available for the subsequent cyclic operation (e.g. Li as part of $LiCoO_2$). This selection of cathode, instead of anode, to pre-store the needed lithium was mainly due to the notion that cathode active materials, such as lithium cobalt oxide, are relatively stable in ambient air (e.g., against oxidation) compared to lithiated graphite or lithiated Si. However, the notion that this amount of lithium that determines the battery capacity is totally supplied from the cathode, limits the choice of cathode active materials because the active materials must contain removable lithium. Also, delithiated products corresponding to $LiCoO_2$ and $LiNiO_2$ formed during charging (e.g. $Li_xCoO_2$ and $Li_xNiO_2$ where 0.4<x<1.0) and overcharging (i.e. $Li_xCoO_2$ and $Li_xNiO_2$ where x<0.4) are not stable [Y. Gao, et al., "Lithium Metal Dispersion in Secondary Battery Anode," U.S. Pat. No. 6,706,447, Mar. 16, 2004 and U.S. Pat. No. 7,276,314 (Oct. 2, 2007)]. In particular, these delithiated products tend to react with the electrolyte and generate heat, which raises safety concerns.

When the lithium-ion cell is assembled and filled with electrolyte, the anode and cathode active materials have a difference in potential of at most about 2 volts between each other. The difference in potential between the two electrodes, after the lithium-ion cell has been charged, is about 4 volts. When the lithium-ion cell is charged for the first time, lithium is extracted from the cathode and introduced into the anode. As a result, the anode potential is lowered significantly (toward the potential of metallic lithium), and the cathode potential is further increased (to become even more positive). These changes in potential may give rise to parasitic reactions on both electrodes, but more severely on the anode. For example, a decomposition product known as solid electrolyte interface (SEI) readily forms on the surfaces of carbon anodes, wherein the SEI layer comprises lithium and electrolyte components. These surface layers or covering layers are lithium-ion conductors which establish an ionic connection between the anode and the electrolyte and prevent the reactions from proceeding any further.

Formation of this SEI layer is therefore necessary for the stability of the half-cell system comprising the anode and the electrolyte. However, as the SEI layer is formed, a portion of the lithium introduced into the cells via the cathode is irreversibly bound and thus removed from cyclic operation, i.e. from the capacity available to the user. This means that, during the course of the first discharge, not as much lithium moves from the anode to the cathode as had previously been inserted into the anode during the first charging operation. This phenomenon is called irreversible capacity and is known to consume about 10% to 20% of the capacity of a lithium ion cell.

A further drawback is that the formation of the SEI layer on the anode after the first charging operation may be incomplete and will continue to progress during the subsequent charging and discharge cycles. Even though this process becomes less pronounced with an increasing number of repeated charging and discharge cycles, it still causes continuous abstraction, from the system, of lithium which is no longer available for cyclic operation and thus for the capacity of the cell. Additionally, as indicated earlier, the formation of a solid-electrolyte interface layer consumes about 10% to 20% of the amount of lithium originally stored at the cathode, which is already low in capacity (typically <200 mAh/g). Clearly, it would be a significant advantage if the cells do not require the cathode to supply the required amount of lithium.

In order to minimize the lithium consumption and thus the irreversible capacity loss of a lithium-ion cell, our research group invented pre-lithiated anode active material particles that can be incorporated into an anode electrode [Aruna Zhamu and Bor Z. Jang, "Method of Producing A Prelithiated Anode for Secondary Lithium Ion Battery," U.S. Pat. No. 8,158,282 (Apr. 17, 2012); and "Secondary Lithium Ion Battery Containing A Prelithiated Anode," U.S. Pat. No. 8,241,793 (Aug. 14, 2012)]. Takahashi, et al [Y. Takahashi, et al., "Secondary Battery," U.S. Pat. No. 4,980,250, Dec. 25, 1990] and Huang, et al. [C. K. Huang, et al., "Method for Fabricating Carbon/Lithium Ion Electrode for Rechargeable Lithium Cell," U.S. Pat. No. 5,436,093, Jul. 25, 1995] disclosed methods by means of which lithium is introduced into carbon/graphite-based anode active material in a premade anode electrode. However, prelithiated carbon- or graphite-based anode active materials (prior to slurry preparation and slurry coating, or after the fabrication of the anode layer but prior to battery assembling) lead to electrodes which can be handled only under non-oxidizing and dry conditions, making practical production of lithium ion batteries difficult. Further, pre-lithiation of a pre-made anode layer (or cathode layer) requires the use of an external electrochemical reaction tank, containing a liquid electrolyte, disposed inside a dry room. This reaction tank (organic solvent electrolyte bath) can discharge organic vapor into the room air, adversely upsetting the dry room operation.

Meissner [E. Meissner, "Secondary Lithium-ion Cell with an Auxiliary Electrode," U.S. Pat. No. 6,335,115 (Jan. 1, 2002)] disclosed a secondary lithium-ion cell which includes a lithium-intercalating, carbon-containing anode, a non-aqueous lithium ion-conducting electrolyte, and a lithium-intercalating cathode including a lithium-containing chalcogen compound of a transition metal, and a lithium-containing auxiliary electrode disposed in the cell to compensate for the irreversible capacity loss in the secondary lithium-ion cell. This auxiliary electrode is spatially separated from the electrolyte when the cell is positioned in a first orientation and contacts the electrolyte when the cell is oriented in a second position, for supplying additional lithium to the cell. Such an additional electrode makes the battery very complicated and difficult to make. Switching between two orientations is not a good strategy since it would complicate the handling of the battery and an average consumer would not pay attention to such a detail to ensure proper operation of such a battery.

The approach of using a sacrificial electrode, in addition to an anode and a cathode in a cell, was also proposed earlier by Johnson, et al. [A. P. Johnson, et al., "Rechargeable Lithium Ion Cell," U.S. Pat. No. 5,601,951, (Feb. 11, 1997)] and by Herr [R. Herr, "Lithium Ion Cell," U.S. Pat. No. 6,025,093 (Feb. 15, 2000)]. Again, this additional electrode further complicates the manufacture and operation of a resulting battery. The assembling operation of a battery containing a highly reactive lithium metal or alloy electrode must be handled in an oxygen-free and moisture-free environment.

Gao, et al. [Y. Gao, et al., "Lithium Metal Dispersion in Secondary Battery Anode," U.S. Pat. No. 6,706,447, Mar. 16, 2004 and U.S. Pat. No. 7,276,314 (Oct. 2, 2007)] disclosed a secondary battery containing an anode that is formed of a host material capable of absorbing and desorbing lithium in an electrochemical system and lithium metal dispersed in the host material. The lithium metal is a finely divided lithium powder and preferably has a mean particle size of less than about 20 microns. The host material comprises one or more materials selected from the group consisting of carbonaceous materials (e.g., graphite), Si, Sn, tin oxides, composite tin alloys, transition metal oxides, lithium metal nitrides and lithium metal oxides. The method of preparing such an anode includes the steps of providing a host material, dispersing lithium metal particles in the host material, and then forming the host material and the lithium metal dispersed therein into an anode. The lithium metal particles and the host material are mixed together in a non-aqueous liquid to produce a slurry, which is then applied to a current collector and dried to form the anode. The approach of Gao, et al has the following drawbacks:

(1) The anode is composed of an anode active material (e.g., graphite or Sn particles) and a discrete lithium metal phase (fine Li metal powder particles) forming a mixture of two types of particles. This implies that the anode still contains highly active lithium particles that are sensitive to oxygen and moisture and must be handled under very stringent conditions during the entire slurry preparation, coating, drying, winding, slitting and packaging procedures.

(2) The amount of lithium metal present in the anode is prescribed to be no more than the maximum amount sufficient to intercalate in, alloy with, or be absorbed by the host material in the anode. For example, if the host material is carbon, the amount of lithium is no more than the amount needed to make $LiC_6$. This implies that the amount of lithium needed for the SEI formation was not considered and, hence, the resulting battery will suffer a capacity loss of 10%-20% after the first cycle.

(3) It is of significance to note that although Gao, et al mentioned in passing that the anode active material can be a mixture of carbon, Sn, Si, etc, the mixture still further contains lithium metal powder particles as an additional, discrete phase that is un-protected. The resulting multi-component, multi-phase mixture is still sensitive to the presence of oxygen and water contents in the air, thus significantly complicating the battery manufacturing operations.

(4) In a follow-on patent application, Gao, et al. [Y. Gao, et al. "Lithium metal dispersion in electrodes," US Patent Pub. No. 2005/0130043 (Jun. 16, 2005)] suggested methods of lithiating an electrode prior to combining electrodes and other components to form a battery. In all cases, the electrode is composed of a mixture of discrete lithium metal particles or wire screen and powder particles of a host material, the latter being partially litiated. As shown in FIG. 1 of Gao'043, the anode comprises discrete lithium metal particles and a host material. Both the discrete lithium metal particles and lithiated carbonaceous material (graphite) are unstable in an oxygen- or moisture-containing environment.

Therefore, there exists an urgent need for a secondary lithium ion battery that has one or more of the following features or advantages:
a) The battery does not contain a sacrificial electrode or an extra electrode in addition to an anode and cathode in a cell;
b) The battery comprises an anode that does not contain lithium metal powder particles dispersed in the anode;
c) The battery contains an anode that comprises at least a non-carbon active material possessing an ultra-high lithium absorbing capacity (e.g., Si that exhibits a specific capacity up to 4,200 mAh/g);
d) The battery comprises an anode that contains an excess amount of lithium to compensate for the formation of SEI layers, in addition to providing enough lithium to intercalate into (or form a compound with) a cathode active material.
e) The battery features a long and stable cycle life due to an anode that comprises fine active particles capable of maintaining their integrity and their contact with the conductive additive and the current collector.

In order to accomplish these goals, we have worked diligently and intensively on the development of new electrode materials and structures. These research and development efforts lead to the present patent application.

SUMMARY OF THE INVENTION

The present invention provides a lithium ion battery that exhibits a significantly improved specific capacity and much longer charge-discharge cycle life. In one preferred embodiment of the present invention, the battery comprises a cathode, an anode, an electrolyte in ionic contact with both the cathode and the anode, and an optional separator disposed between the cathode and the anode, wherein, prior to the battery being assembled or immediately after the battery assembling, the anode comprises (a) an anode active material layer composed of fine particles of a first anode active material having an average size from 1 nm to 10 μm (preferably from 1 nm to 1 μm and further preferably from 1 nm to 100 nm), an optional conductive additive, and an optional binder that bonds the fine particles and the conductive additive together to form the anode active material layer of structural integrity and (b) a layer of lithium metal or lithium metal alloy having greater than 50% by weight (preferably greater than 80%) of lithium therein, wherein the layer of lithium metal or lithium metal alloy is in physical contact with the anode active material layer and provides from 1% to 120% of a required lithium storage capacity of the anode layer. This layer of lithium metal or lithium metal alloy is typically from 1 nm to 100 μm in thickness. The anode active layer or the layer of lithium metal or lithium metal alloy, prior to battery assembly, may further contain an amount of electrolyte.

After the battery is assembled and the anode is brought into contact with the electrolyte, lithium ions or atoms from the layer of lithium metal or lithium metal alloy diffuse into the first anode active material particles to form lithiated anode particles. This occurs before the battery undergoes the first charge or discharge. The formation of these lithiated anode particles can consume the entire layer of lithium metal or metal alloy, or can leave behind a thin layer or small amount of lithium metal or lithium metal alloy. Such a left-over amount of lithium or lithium alloy can continue to provide additional source of lithium ions to compensate for potentially continued consumption of lithium ions (e.g. due to repeated formation and breakage of solid-electrolyte interface, SEI) during repeated charge/discharge operations of the battery. This strategy leads to significantly improved battery cycle life.

The anode active material may be selected from the following groups of materials:
(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a particle or thin film (coating) form. The coating is preferably thinner than 10 μm, more preferably thinner than 1 μm, and most preferably thinner than 100 nm;
(b) Alloys or intermetallic compounds of Si, Ge, Sn, Pb, Sb, Bi, Zn, Al, Fe, or Cd, stoichiometric or non-stoichiometric with other elements;
(c) Oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd; and
(d) Combinations thereof and combinations thereof with a carbon or graphite material.

In certain preferred embodiment, the lithiated anode particles comprise a lithiated silicon represented by a chemical formula of $Li_4Si$, $Li_{4.4}Si$, or $Li_xSi$, wherein numerical x is between 0.02 and 4.4. Preferably, the amount of lithium in the layer of lithium metal or lithium metal alloy is sufficient to lithiate an anode active material up to 1% to 120% of this anode active material's full lithium storage capacity (the extra 20% beyond 100% being reserved to compensate for continued losses of lithium during subsequent battery charge/discharge operations). Preferably, the amount of lithium in the layer of lithium metal or lithium metal alloy is from 5% to 110% (further preferably no less than 10% and most preferably no less than 20%) of the anode active material's lithium storage capacity.

In certain embodiments, the battery anode can contain a semiconductor (e.g. Si and Ge) that is doped with an n-type dopant and/or a p-type dopant.

Preferably, the anode active material layer contains a binder that is an elastomer having a recoverable tensile elastic deformation greater than 2% (preferably >5%, further preferably >10%, and most preferably from 15% to 700%).

In certain preferred embodiments, the anode active material layer contains a binder that is porous having a porosity level from 1% to 90%. This porous binder provides additional room to accommodate volume expansion of anode active material particles. In certain embodiments, the anode active material layer is porous having a porosity level from 1% to 50%.

It may be noted again that lithiation of an anode active material (e.g., Si particles or thin film) in a prior art lithium ion battery during the charging operation is known to induce a volume change to the anode active material up to 300-400% of its original dimension. Such highly dilated particles or thin film are extremely brittle and prone to pulverization or fragmentation. During repeated charge/discharge cycles, the anode active material tends to quickly become pulverized and the resulting fragments lose contacts with the conductive additive and the current collector. Those fragments are no longer capable of providing electrons to the external circuit. Furthermore, during charging of the lithium-ion battery, lithium ions come out of the crystal structure of the cathode active material without inducing volume reduction of the cathode while generating large volume expansion of the anode active material. Such a volume expansion of the anode active material particles upon intercalation of lithium ions leads to significant volume changes of the anode layer, which could mechanically damage the electrode or the battery structure.

The presently invented anode electrode composition and structure have surprisingly overcome the longstanding issues associated with the volume changes of the anode active material and the anode electrode. When the lithium ions are ionized or released from the layer of lithium metal or lithium metal alloy to intercalate into the anode active material particles (before or after battery assembling), the volume of these particles gets expanded. However, the layer of lithium metal or lithium metal alloy decreases in volume, providing room to accommodate the expanded volume of individual anode active material particles as well as the expanded volume of the anode active material layer, avoiding the stress build-up due to the otherwise constrained volume expansion inside the electrode. Such a strategy enables stress relaxation of the anode active layer in the transverse direction (anode layer thickness direction) during lithium intercalation of the active material particles before or after the battery assembling procedure. Consequently, repeated charge/discharge operations no longer induce significant battery capacity decay caused by anode active material expansion/shrinkage.

In certain embodiments, the anode active material layer contains a binder that is porous having a porosity level from 1% to 90%. In certain embodiments, the anode active material layer is porous having a porosity level from 1% to 50%. Preferably, the anode active material layer contains a binder that is an elastomer having a recoverable tensile elastic deformation greater than 2% (preferably >5%, more preferably from 10% to 700%).

In certain embodiments, the anode further comprises an amorphous carbon or polymeric carbon that forms a coating on a surface of the fine particles of the anode active material or forms a matrix in which the fine particles are dispersed. The carbon coating preferably has a thickness less than 1 μm. The carbon may be obtained from pyrolization of a polymer, pitch, or organic precursor, or obtained by chemical vapor deposition.

In certain preferred embodiments, the anode further comprises a protective material that forms a coating on a surface of the fine particles of the anode active material or forms a matrix in which said fine particles are dispersed. The protective material may be selected from graphene, an electron-conducting polymer, an ion-conducting polymer, a carbon coating, or a combination thereof.

In certain embodiments, the anode further comprises a desired amount of a second anode active material selected from particles of graphite, hard carbon, soft carbon, mesocarbon micro-bead, surface-modified graphite, carbon-coated graphite, or a combination thereof.

The anode may comprise a conductive additive selected from the group consisting of carbon black, electro-spun nanofibers, carbonized electro-spun nanofibers, vapor-grown carbon or graphite nanofibers, carbon or graphite whiskers, carbon nanotubes, nanoscaled graphene platelets, metal nanowires, metal-coated nanowires, carbon-coated nanowires, metal-coated nanofibers, carbon-coated nanofibers, and combinations thereof.

The battery may contain a cathode that does not contain a full capacity of lithium initially when the battery is assembled. In certain embodiments, the cathode does not contain any lithium initially when the battery is assembled.

The anode active layer may be supported by or bonded to an anode current collector. It may be noted that each side of the two sides (two primary surfaces) of a current collector (e.g. Cu foil, stainless steel foil, Ni foil, Ti foil, Ni foam, Cu foam, etc.) may be coated with a desired anode active material that is covered with a layer of lithium metal or lithium metal alloy film, which is protected by a sealing layer (e.g. plastic film or paper) that protects against water or oxygen.

The electrolyte in the lithium-ion battery may be selected from organic liquid electrolyte, ionic liquid electrolyte, gel electrolyte, polymer electrolyte, solid-state electrolyte, or a combination thereof.

The present invention also provides an anode electrode layer for use in a lithium-ion battery. The anode electrode layer comprises (a) an anode active material layer composed of fine particles of a first anode active material having an average size from 1 nm to 10 μm, an optional conductive additive, and an optional binder that bonds the fine particles and the conductive additive together to form the anode active material layer of structural integrity and (b) a layer of lithium metal or lithium metal alloy having greater than 50% by weight (preferably >80%) of lithium therein, wherein said layer of lithium metal or lithium metal alloy is in physical contact with said anode active material layer.

The anode electrode layer may further comprise an anode current collector wherein the anode active layer is supported by or bonded to the anode current collector. The anode electrode layer may further comprise a protective film that covers the layer of lithium metal or lithium metal alloy.

The anode active layer or the layer of lithium metal or lithium metal alloy may further contain an amount of electrolyte or lithium ion-conducting liquid even prior to the battery assembling procedure. The electrolyte is selected from organic liquid electrolyte, ionic liquid electrolyte, gel electrolyte, polymer electrolyte, solid-state electrolyte, or a combination thereof.

Preferably, the first anode active material particles have an average particle from 1 nm to 1 μm. More preferably, the first anode active material particles have an average particle from 1 nm to 100 nm.

The anode active material may be selected from the group consisting of: (a) silicon (Si), germanium (Ge), tin (Sn), lead (Pb), antimony (Sb), bismuth (Bi), zinc (Zn), aluminum (Al), and cadmium (Cd); (b) alloys or intermetallic compounds of Si, Ge, Sn, Pb, Sb, Bi, Zn, Al, or Cd with other elements, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, or Cd, and their mixtures or composites; and (d) combinations thereof.

In certain embodiments, the anode active material layer contains a binder that is porous having a porosity level from 1% to 90%. In certain embodiments, the anode active material layer is porous having a porosity level from 1% to 50%. Preferably, the anode active material layer contains a binder that is an elastomer having a recoverable tensile elastic deformation greater than 2% (preferably >5%, more preferably from 10% to 700%).

In certain embodiments, the anode further comprises an amorphous carbon or polymeric carbon that forms a coating on a surface of the fine particles of the anode active material or forms a matrix in which the fine particles are dispersed. The carbon coating preferably has a thickness less than 1 µm. The carbon may be obtained from pyrolization of a polymer, pitch, or organic precursor, or obtained by chemical vapor deposition.

In certain preferred embodiments, the anode further comprises a protective material that forms a coating on a surface of the fine particles of the anode active material or forms a matrix in which said fine particles are dispersed. The protective material may be selected from graphene, an electron-conducting polymer, an ion-conducting polymer, a carbon coating, or a combination thereof.

In certain embodiments, the anode further comprises a desired amount of a second anode active material selected from particles of graphite, hard carbon, soft carbon, meso-carbon micro-bead, surface-modified graphite, carbon-coated graphite, or a combination thereof.

The anode may comprise a conductive additive selected from the group consisting of carbon black, electro-spun nanofibers, carbonized electro-spun nanofibers, vapor-grown carbon or graphite nanofibers, carbon or graphite whiskers, carbon nanotubes, nanoscaled graphene platelets, metal nanowires, metal-coated nanowires, carbon-coated nanowires, metal-coated nanofibers, carbon-coated nanofibers, and combinations thereof.

The battery may contain a cathode that does not contain a full capacity of lithium initially when the battery is assembled. In certain embodiments, the cathode does not contain any lithium initially when the battery is assembled.

The anode active layer may be supported by or bonded to an anode current collector. It may be noted that each side of the two sides (two primary surfaces) of a current collector (e.g. Cu foil, stainless steel foil, Ni foil, Ti foil, Ni foam, Cu foam, etc.) may be coated with a desired anode active material that is covered with a layer of lithium metal or lithium metal alloy film, which is protected by a sealing layer (e.g. plastic film or paper) that protects against water or oxygen.

In certain embodiments, the anode active layer further comprises a porous separator layer that protects the lithium metal or lithium metal alloy layer.

With any one of such anodes, it is not necessary for the cathode to pre-store the full amount of the required lithium. In fact, the cathode does not need to contain any lithium initially when the battery is assembled. This will further increase the battery capacity by up to 10-20%. These and other advantages and features of the present invention will become more transparent with the description of the following best mode practice and illustrative examples.

The present invention also provides a process for producing the above-stated anode electrode layer. The process comprises: (a) preparing an anode active material layer composed of fine particles of a first anode active material having an average size from 1 nm to 10 µm, a conductive additive, and an optional binder that bonds the fine particles and the conductive additive together to form the anode active material layer of structural integrity and (b) depositing a layer of lithium metal or lithium metal alloy onto a surface of the anode active material layer to form said anode electrode.

In certain embodiments, the step of preparing the anode active material layer comprises forming the conductive additive into a conductive foam and incorporating the fine particles of said first anode active material into pores of said conductive foam. Preferably, the conductive foam is selected from carbon foam, graphite foam, or graphene foam.

In some embodiments, the conductive foam contains a conductive material selected from the group consisting of carbon black, electro-spun nanofibers, carbonized electro-spun nanofibers, vapor-grown carbon or graphite nanofibers, carbon or graphite whiskers, carbon nanotubes, graphene sheets, metal nanowires, metal-coated nanowires, carbon-coated nanowires, metal-coated nanofibers, carbon-coated nanofibers, and combinations thereof.

In certain embodiments, the step of preparing the anode active material layer comprises coating one layer of the anode active material onto at least one primary surface of an anode current collector. Preferably, both primary surfaces of a current collector are each coated with a layer of anode electrode.

The step of depositing a layer of lithium metal or lithium metal alloy onto a surface of the anode active material layer may be conducted with a process selected from physical vapor deposition, chemical vapor deposition, sputtering, laser ablation deposition, or electrochemical deposition.

DETAILED DESCRIPTION OF PREFERRED EMBODIMENTS

This invention is related to anode materials for high-capacity lithium batteries, which are preferably secondary batteries based on a non-aqueous electrolyte, polymer gel electrolyte, polymer electrolyte, solid-state electrolyte, or ionic liquid electrolyte. The shape of a lithium metal or lithium ion battery can be cylindrical, square, button-like, etc. The present invention is not limited to any battery shape or configuration.

Figure 1A:
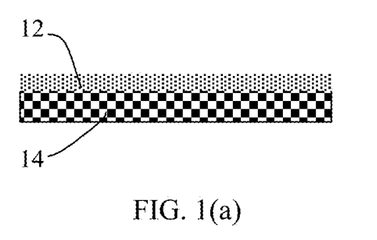
FIG. 1(a) an anode electrode composed of an anode active material layer and a lithium metal or alloy layer covering the anode active material layer according to a preferred embodiment of the present invention.
Figure 1B:
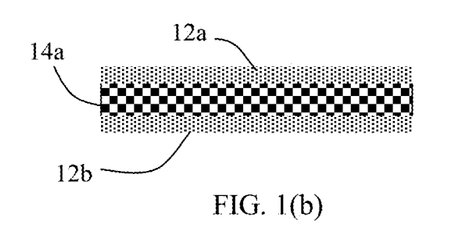
FIG. 1(b) an anode electrode composed of an anode active material layer and two lithium metal or Li alloy layers covering the two primary surfaces of the anode active material layer according to another preferred embodiment of the present invention.

The present invention provides a lithium ion battery that comprises a cathode, an anode, an electrolyte in ionic contact with both the cathode and the anode, and an optional separator disposed between the cathode and the anode, wherein, prior to the battery being assembled or immediately after the battery assembling, the anode comprises (a) an anode active material layer (e.g. numeral 14 in FIG. 1(a)) composed of fine particles of a first anode active material having an average size from 1 nm to 10 µm (preferably from 1 nm to 1 µm and further preferably from 1 nm to 100 nm), an optional conductive additive, and an optional binder that bonds the fine particles and the conductive additive together to form the anode active material layer of structural integrity and (b) a layer of lithium metal or lithium metal alloy (e.g. 12 in FIG. 1(b)) having greater than 50% by weight (preferably greater than 80%) of lithium therein, wherein the layer of lithium metal or lithium metal alloy is in physical contact with the anode active material layer and provides from 1% to 120% of a required lithium storage capacity of the anode layer. This layer of lithium metal or lithium metal alloy is typically from 1 nm to 100 µm in thickness. The anode active layer or the layer of lithium metal or lithium metal alloy, prior to battery assembly, may further contain an amount of electrolyte.

Figure 1C:
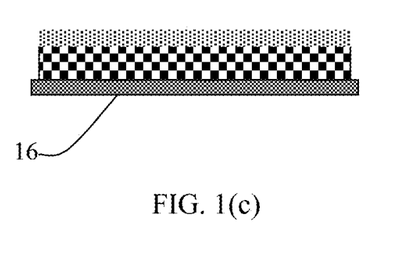
FIG. 1(c) a current collector-supported anode electrode composed of an anode active material layer and a lithium metal or alloy layer covering the anode active material layer according to a preferred embodiment of the present invention.
Figure 1D:
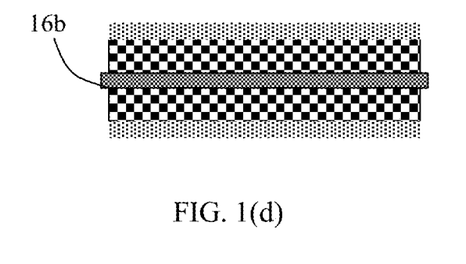
FIG. 1(d) an anode electrode composed of an anode active material layer and a lithium metal or alloy layer covering the anode active material layer on each primary surface of a current collector (having 2 primary surfaces), according to another preferred embodiment of the present invention.

In certain embodiments, as illustrated in FIG. 1(b), an anode active layer (14a) may be coated with two separate layers (12a, 12b) of lithium metal or lithium metal alloy. FIG. 1(c) shows that an anode can contains an anode current collector (e.g. a Cu foil, 16) to support the anode active layer and lithium metal or alloy layer. Alternatively, as illustrated in FIG. 1(d), one current collector (16b) may be used to support one anode active layer and one lithium metal or alloy layer on each side (primary surface) of the two sides of the current collector.

In a conventional Li-ion battery, lithiation of an anode active material (e.g., Si particles) during the charging operation of the battery is known to induce a volume change in the anode active material by 300-400% of its original volume. Such highly dilated particles are extremely brittle and prone to pulverization or fragmentation. During the repeated charge/discharge cycles, the anode active material tends to quickly become pulverized and the resulting fragments lose contacts with the conductive additive and the current collector. Those fragments are no longer active in providing electrons to the external circuit.

The presently invented approach enables free expansion of the high-capacity anode active material (e.g. Si and $SnO_2$ particles) in a controlled manner. Some volume expansion may be allowed to occur outside of the intended battery cell (provided electrolyte is present in the anode prior to battery assembling). These particles, upon lithiation (intercalation by lithium ions from the lithium metal or alloy layer), expands their volume into the intentionally implemented pores in the anode active material layer or into the space created by lithium metal or alloy layer due to release of lithium atoms. In the former mechanism, the pores are present between active material particles and the porous binder resin. By making the binder resin porous (e.g. by using a foaming agent), one could produce additional spaces to accommodate the expanded volume of active material particles, leading to improved cycle life of the resulting lithium-ion battery.

After the anode electrode, a porous separator, and a cathode are assembled into a cell and the electrolyte is injected into the cell, lithium ions are released from the layer of lithium metal or alloy and diffuse into the anode active material particles to conduct the pre-designed pre-lithiation in a controlled manner, prior to the first charge or discharge of the battery.

Furthermore, even though pre-lithiated particles could still shrink/expand in volume during the subsequent discharge/charge process when lithium is extracted out of or intercalate into the anode active material, we have surprisingly found that the resulting anode was capable of maintaining a high capacity for a much longer cycle life compared with conventional anode structures. Presumably, repeated shrinkage/expansion of prelithiated particles did not lead to loss of contacts with conductive additives (e.g., carbon black or fine graphite particles) and the current collector during the subsequent discharge and charge cycles.

For a lithium ion battery, according to a preferred embodiment of the present invention, the starting anode active material (in a fine powder form) may be selected from the following groups of materials: (a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 µm, more preferably thinner than 1 µm, and most preferably thinner than 100 nm; (b) The alloys or intermetallic compounds of Si, Ge, Sn, Pb, Sb, Bi, Zn, Al, or Cd, stoichiometric or non-stoichiometric with other elements; (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd; and (d) Combinations thereof and their combinations with carbon/graphite particles.

The anode active material for use in the presently invented lithium ion battery preferably includes at least one of silicon (Si), germanium (Ge), and tin (Sn) as an element. This is because silicon, germanium, and tin have a high capability of inserting and extracting lithium, and can reach a high energy density. The next preferred group of elements includes lead (Pb), antimony (Sb), bismuth (Bi), zinc (Zn), aluminum (Al), and cadmium (Cd). When any of these two sets of elements are included as a primary element of an electro-active material (defined as being capable of absorbing and extracting lithium ions in the present context), which is prelithiated and pre-pulverized, the cycling stability of the resulting anode material can be significantly improved. Another preferred class of anode active material include the oxides, carbides, nitrides, sulfides, phosphides, selenides, tellurides, or their mixtures (e.g., co-oxides or composite oxides) of: (a) Si, Ge, Sn, Pb, Sb, Bi, Zn, Al, Fe, or Cd for anode active materials; or (b) Co, Ni, Mn, V, Ti for cathode active materials. They can be readily produced in a powder form.

There is no limitation on the types of electrolyte used in the instant battery. However, the electrolyte typically contains a lithium salt dissolved in a liquid solvent and/or polymer matrix. The liquid solvent can be an organic solvent or an ionic liquid solvent. The lithium salts to be incorporated into a non-aqueous electrolyte may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is typically and preferably from 0.5 to 5.0 mol/l.

The formation of a lithium metal or lithium metal alloy layer onto a surface of an anode active layer may be accomplished in several different ways. A physical process entails depositing a Li coating on a surface of an anode active material layer. A thin lithium layer can be deposited on the surface of a thin anode active material layer (e.g., Si particles+graphite platelets+binder resin) using a standard thin film process, such as thermal evaporation, electron beam evaporation, sputtering, and laser ablation. A vacuum is used during the deposition process to avoid reactivity between the atomic lithium and molecules of lithium reactive substances such as water, oxygen, and nitrogen. A vacuum of greater than 1 milli-Torr is desirable. When electron beam deposition is used a vacuum of $10^{-4}$ Torr is desired and a vacuum of $10^{-6}$ Torr is preferred to avoid interaction between the electron beam and any residual air molecules.

The evaporative deposition techniques involve the heating of a lithium metal to create a lithium vapor. The lithium metal can be heated by an electron beam or by resistive heating of the lithium metal. The lithium vapor deposits lithium onto an anode active material layer. To promote the deposition of lithium metal the anode active material layer may be cooled or maintained at a temperature lower than the temperature of the lithium vapor. A thickness monitor such as a quartz crystal type monitor can be placed near the substrate to monitor the thickness of the film being deposited. Alternatively, laser ablation and sputtering techniques can be used to promote thin lithium film growth on an anode active material layer. For example, argon ions can be used in the sputtering process to bombard a solid lithium metal target. The bombarding knocks lithium off of the target and deposits it on the surface of an anode active material layer. Laser ablation processes can be used to knock lithium off of a lithium target. The separated lithium atoms are then then directed to deposit on a surface or two surfaces of an anode active material layer.

A simple way of producing an anode electrode is to laminate a layer of lithium metal or lithium metal alloy foil with a layer of anode active material; e.g. via roll-pressing. A less preferred process for producing the layer of lithium metal involves electro-chemically forcing Li atoms to migrate and deposit onto a surface of an anode layer under the influence of an electromotive force (emf). In a typical arrangement, an anode active material layer is used as a positive electrode and Li metal sheet or rod as a negative electrode. This is similar to an electro-plating procedure, but the process must be controlled in such a manner that Li atoms are only allowed to deposit onto the surface of the anode active layer, not to permeate into the bulk of the active material particles.

Once a layer of lithium metal or lithium alloy is deposited onto a surface of an anode active material layer, one may choose to spray a layer of electrolyte onto the lithium metal layer prior to the battery assembly procedure. This electrolyte should preferably identical or similar to the intended electrolyte of the resulting battery cell. Such a sprayed electrolyte would promote wettability or compatibility with the electrolyte to be injected into the assembled cell.

The layer of lithium metal or lithium metal alloy may then be covered or protected by a protective film (e.g. plastic film, paper, etc.).

The step of providing an anode active material may comprise providing a doped semiconductor material. Such a doped semiconductor material may be selected from Si or Ge doped with n-type and/or p-type dopants. Commonly used n-type dopants are P, As, and Sb and commonly used p-type dopants are Al, Ga, and In.

It may be noted that the electro-active material may be coated with a carbonizable coating material (e.g., phenolic resin, poly(furfuryl alcohol), glucose, coal tar pitch, or petroleum pitch). The coating can then be carbonized to produce an amorphous carbon or polymeric carbon coating on the surface of these active material particles (e.g. Si, SiO, $SnO_2$, and $Co_3O_4$). Such a conductive surface coating can help maintain a network of electron-conducting paths during repeated charge/discharge cycles and prevent undesirable chemical reactions between active particles and electrolyte from happening. Hence, the presently invented method may further comprise a step of coating a surface of the comminuted, prelithiated fine particles with a thin layer of carbon having a thickness less than 1 μm. The thin layer of carbon preferably has a thickness less than 100 nm. Such a thin layer of carbon may be obtained from pyrolization of a polymer, pitch, or organic precursor or obtained by chemical vapor deposition.

Alternatively, the electro-active material may be dispersed in a protective matrix provided this matrix is lithium ion-conducting. A range of materials have been found to be conductive to lithium, including oxide (e.g., copper oxide), polymer (sulfonated conductive polymer), polymeric carbon, amorphous carbon, and meso-phase carbon. The prelithiated particles may be dispersed in a carbonizable precursor material (e.g., phenolic resin, poly(furfuryl alcohol), coal tar pitch, petroleum pitch, or meso-phase pitch). The resulting composite can then be subjected to a heat treatment convert the carbonizable precursor material into an amorphous carbon or polymeric carbon matrix (in which Si particles are dispersed, for instance). Such a conductive matrix coating can help maintain a network of electron-conducting paths during repeated charge/discharge cycles and prevent undesirable chemical reactions between Si and electrolyte from happening.

Further preferably, the protective matrix material (e.g., polymeric carbon, amorphous carbon, or meso-phase carbon) may be further reinforced with a high-strength nanofiller such as a carbon nanotube (CNT) or graphene (also referred to as nano graphene platelet, NGP). An NGP is an individual nano graphene sheet (individual hexagonal plane of carbon atoms) or a stack of multiple nano graphene sheets. The structures of these materials may be best visualized by making a longitudinal scission on the single-wall or multi-wall of a nanotube along its tube axis direction and then flattening up the resulting sheet or plate. In practice, NGPs are obtained from a precursor material, such as minute graphite particles, using a low-cost process, but not via flattening of CNTs. One of the cost-effective processes is exfoliation of graphite to produce graphite worms of loosely connected flakes, followed by separation of these flakes into isolated (unconnected) nano graphene platelets using mechanical means, such as air jet milling, rotating-blade shearing, and ultrasonication. These nano materials are cost-effective substitutes for CNTs or other types of nano-rods for various scientific and engineering applications.

After extensive and in-depth research and development efforts, we came to realize that NGPs (particularly those with a thickness<5 nm, preferably<1 nm) are very effective in enhancing the mechanical properties of a protective matrix (such as amorphous carbon or polymeric carbon, polymer, and metal oxide) in a lithium battery electrode. NGP-reinforced protective matrix materials are capable of cushioning the stresses-strains induced to an electro-active particle (e.g. Si particles) during lithium insertion and extraction (discharge and charge) cycles. Surprisingly, NGPs were found to significantly enhance the structural integrity (strength and fracture resistance) of a range of protective matrix materials for electrodes, to the extent that a high specific capacity was maintained over a much larger number of cycles compared with those electrodes without an NGP-reinforced protective matrix. This could not be achieved with a carbon matrix containing conventional graphite particles. Preferably, the resulting nanocomposite composition (comprising prelithiated anode active particles, NGPs, and a matrix material) is made into a form of fine spherical or ellipsoidal particles.

Hence, in one preferred embodiment, the present invention provides a nano graphene-reinforced nanocomposite solid particle composition containing both NGPs and an electrode active material (e.g. Si particles) dispersed in a protective matrix. The electrode active material is in the form of dispersed fine particles (particulates of various shapes, filaments, rods, tubes, and wires, etc.) with a dimension (e.g., diameter) smaller than 1 μm (preferably smaller than 500 nm, further preferably smaller than 200 nm). This nanocomposite solid particle composition is preferably in a form of fine particle (preferably <10 μm, more preferably <5 μm, and most preferably <2 μm) and is most preferably of a spherical or ellipsoidal shape. Such a shape is conducive to the formation of an electrode with a high tap density. A higher tap density means a better packing of electro-active material particles that results in a greater amount of active material per unit volume under an identical coating and laminating condition for electrode fabrication.

Hence, the present invention provides a lithium-ion battery comprising a cathode, an anode, a separator disposed between the cathode and the anode, and electrolyte in ionic contact with both the cathode and the anode, wherein the anode active material layer comprises: (A) fine particles of a first anode active material that has been prelithiated, having an average size less than 10 μm; (B) nano graphene platelets; and (C) a protective matrix reinforced by the nano graphene platelets wherein the fine particles of the first anode active material and the graphene platelets are dispersed in the protective matrix to form a nanocomposite containing x weight fraction of fine particles, y weight fraction of graphene platelets, and z weight fraction of protective matrix, where 2%<x<90%; 2%<y<90%; 5%<z<80%; and x+y+z=100%. After an extensive study we have discovered that the most preferred nanocomposite compositions are those with 10%<x<60%, 2%<y<30%, 5%<z<60%, and x+y+z =100%.

The nanocomposite solid particles may be made by (a) preparing NGPs from a laminar graphite material (such as natural graphite, artificial graphite, MCMB, graphite fiber, and carbon fiber); (b) preparing a precursor to a protective matrix material, (c) mixing the NGPs and an electro-active material (e.g., prelithiated Si nano particles, prelithiated nanowires, prelithiated nano-rods, etc) with the precursor (possibly or optionally in a solvent or liquid medium) to form a suspension, (d) transforming the suspension into droplets (e.g., forming micron-sized solid particles using, for instance, an atomization or aerosol formation technique) and removing the solvent; and (e) converting the precursor into the desired protective matrix material (e.g., converting a polymer into a polymeric carbon via heat treatments). Alternatively, NGPs and electro-active material particles may be mixed with or coated by a monomer (e.g., a triazine-based compound), a polymer (e.g., sulfonated polyaniline), a ceramic material (e.g., a metal oxide) to form spherical solid particles that require no further chemical conversion. In some cases, additional protective material may be coated onto solid particles, e.g. further coated with an amorphous carbon matrix via chemical vapor deposition.

For the cases where anode active particles are coated with a protective coating or dispersed in a protective matrix (but in a form of fine composite particles), a conductive particle may or may not be necessary in the preparation of an anode structure. It would not be necessary if the protective matrix is carbon or NGP-reinforced carbon. If deemed desirable, acetylene black (AB), carbon black (CB), or ultra-fine graphite particles may be used as a conductive additive. Conductive additives may comprise an electrically conductive material selected from the group consisting of electro-spun nanofibers, carbonized electro-spun nanofibers, vapor-grown carbon or graphite nanofibers, carbon or graphite whiskers, carbon nanotubes, nanoscaled graphene platelets, metal nanowires, metal-coated nanowires, carbon-coated nanowires, metal-coated nanofibers, carbon-coated nanofibers, and combinations thereof. A binder material may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. A typical mixing ratio of these ingredients is 80 to 85% by weight for the anode active material, 5 to 15% by weight for the conductive additive, and 5 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

In a preferred embodiment of the present invention, the production process may comprise combining multiple fine particles of prelithiated anode active material with a conductive additive and/or a binder material, plus a desired amount of another type of anode active materials selected from particles of graphite, hard carbon, soft carbon, meso-carbon micro-bead, surface-modified graphite, carbon-coated graphite, or a combination thereof.

Hence, a lithium ion battery may contain an anode that comprises at least two types of anode active material wherein at least one type of active material is prelithiated (e.g., Si and Sn) and at least one type of active material is not prelithiated (e.g., carbonaceous material, such as graphite, hard carbon, soft carbon, surface-modified graphite, chemically modified graphite, or meso-carbon micro-beads, MCMBs). Prelithiated carbonaceous anode materials are unstable in regular room air. The present invention enable the battery to contain an anode that comprises at least a non-carbon active material possessing an ultra-high lithium absorbing capacity (e.g., Si that exhibits a specific capacity up to 4.200 mAh/g). The battery comprises an anode that contains an excess amount of lithium (disposed inside a non-carbon anode active material, not on its surface) to compensate for the formation of SEI layers, in addition to providing enough lithium to intercalate into (or form a compound with) a cathode active material.

The present invention allows the excess amount of lithium to be stored in high-capacity anode active materials (there is no need to make use of the full capacity of Si, for instance). The capacity limitation is on the cathode side, rather than the anode side. The present approach obviates the need for the cathode to supply the needed lithium, thereby further reducing the needed initial weight of the cathode or increasing the cathode weight that can be incorporated in a cell. This strategy can increase the overall capacity of a lithium ion battery by another 10%-20%.

Hence, in summary, the present invention provides a high-capacity, high cycle-life rechargeable lithium ion battery. This lithium-ion battery comprises a cathode, an anode, a separator disposed between the cathode and the anode, and electrolyte in ionic contact with both the cathode and anode, wherein the anode comprises fine particles of a first anode active material that contains lithium atoms prelithiated into the volume of at least one of the fine particles. The fine particles have a size less than 1 µm, preferably less than 500 nm, and most preferably less than 200 nm.

The anode may further comprise a desired amount of a second anode active material selected from particles of graphite, hard carbon, soft carbon, meso-carbon micro-bead, surface-modified graphite, carbon-coated graphite, or a combination thereof. These carbon- or graphite-based anode active materials, by themselves, can be pre-lithiated, but the resulting products are not air-stable and must be handled in an oxygen-free and moisture-free environment. This would make mass-manufacturing of rechargeable batteries so much more challenging and expensive. By contrast, one may choose to pre-store some lithium in a non-carbon material (e.g., prelithiated Si) that enables convenient production of rechargeable lithium ion batteries that also have a much higher capacity.

The anode can comprise a conductive additive selected from the group consisting of carbon black, electro-spun nanofibers, carbonized electro-spun nanofibers, vapor-grown carbon or graphite nanofibers, carbon or graphite whiskers, carbon nanotubes, nanoscaled graphene platelets, metal nanowires, metal-coated nanowires, carbon-coated nanowires, metal-coated nanofibers, carbon-coated nanofibers, and combinations thereof.

With such an anode, it is not necessary for the cathode to pre-store the full amount of the required lithium. In fact, the cathode does not need to contain any lithium initially when the battery is assembled. This will further increase the battery capacity up to 10-20%. These and other advantages and features of the present invention will become more transparent with the description of the following best mode practice and illustrative examples.

There is no limitation on the type of cathode active material used in the presently invented lithium-ion battery. The cathode active material can be an organic or polymeric material, an inorganic material, or a combination thereof.

For instance, the inorganic cathode (positive electrode) active material may be selected from a wide variety of oxides, such as lithium-containing nickel oxide, lithium-containing cobalt oxide, lithium-containing nickel-cobalt oxide, lithium-containing manganese oxide, lithium-containing nickel-manganese-cobalt oxide (NMC), lithium-containing nickel-cobalt-aluminum oxide (NCA), lithium-containing vanadium oxide, lithium iron phosphate, lithium manganese phosphate, lithium manganese-iron phosphate, and other lithium metal (or mixed metals) phosphate. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate because these oxides provide a relatively high cell voltage and relatively good cycling stability.

Lithium cobalt oxide ($LiCoO_2$) is one of the most important cathode materials used in lithium-ion secondary batteries. $LiCoO_2$ and other similar lithium transition metal oxides, such as lithium manganese oxide, lithium nickel oxide, and lithium vanadium oxide, can be prepared by various methods using different lithium and transition metal sources. In general, bulk transition metal oxides are prepared by solid-state reactions, which involve repeated heat processes at high temperatures. Such processes generally afford the thermodynamically more stable phases and in general, microcrystalline materials are obtained. Lower temperatures and mild processing conditions may be used for several methods, such as co-precipitation, sol-gel process with/without template, synthesis by precursor, ion-exchange reaction and hydrothermal. These methods also result in particles with better control of morphology and smaller size. Other methods include flame spray pyrolysis, dehydro-freezing evaporation, supercritical dehydration, supersonic hydrothermal synthesis, and ultrasonic processing.

As an example, a process for producing lithium-cobalt oxide my include (a) mixing cobalt oxide having an average particle size of not more than 0.1 µm, with a lithium compound; and (b) calcining the obtained mixture at a temperature of 500 to 850° C. As compared to the conventional processes that begin with larger cobalt oxide particles (e.g., diameter>10 µm), such a process is advantageous in that lithium-cobalt oxide particles (1) can be produced with a short calcination time, (2) have a narrow particle size distribution, and (3) have a uniform small particle size.

The flame-spray pyrolysis method may include the steps of: (a) spraying minute droplets containing a solution of dissolved lithium salt and cobalt salt at room temperature; (b) atomizing the minute droplets through rapid expansion into a high temperature flame generated by combusting oxygen and hydrogen; (c) decomposing and oxidizing the atomized minute droplets thermally at high temperature to produce nano-sized oxides in gaseous phase; and (d) collecting the produced nano-sized composite oxides particles.

Lithium iron phosphate $LiFePO_4$ is a promising candidate of cathode material for lithium-ion batteries. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. A major drawback with this material is that it has very low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. This major problem may be overcome by using a nanoscaled powder (to reduce the Li ion diffusion path and electron transport path distance) and doping the powder with a transition metal. Lithium iron phosphate ($LiFePO_4$) nano particles may be prepared by ball milling of conventional micron-sized particles, which may be prepared by a solid state reaction using LiOH.H$_2$O, (CH$_3$COO)$_2$Fe, and NH$_4$H$_2$PO$_4$ as raw materials. Additionally, Li$_{1.3}$Al$_{0.3}$Ti$_{1.7}$(PO$_4$)$_3$ materials, as an example of lithium mixed-metal phosphate, may be successfully prepared by the solution deposition using lithium acetate, aluminum nitrate, ammonium dihydrogen phosphate and titanium butoxide as starting materials. The resulting material may be ball-milled to sub-micron or nanometer scales. This is but one example of a host of complex metal phosphate-based cathode materials.

Again, the application of the presently invented hybrid anode approach is not limited to any particular class of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of CoF$_3$, MnF$_3$, FeF$_3$, VF$_3$, VOF$_3$, TiF$_3$, BiF$_3$, NiF$_2$, FeF$_2$, CuF$_2$, CuF, SnF$_2$, AgF, CuCl$_2$, FeCl$_3$, MnCl$_2$, and combinations thereof. In certain preferred embodiments, the inorganic material is selected from a lithium transition metal silicate, denoted as Li$_2$MSiO$_4$ or Li$_2$Ma$_x$Mb$_y$SiO$_4$, wherein M and Ma are selected from Fe, Mn, Co, Ni, V, or VO; Mb is selected from Fe, Mn, Co, Ni, V, Ti, Al, B, Sn, or Bi; and x+y≤1.

In certain preferred embodiments, the inorganic material is selected from a transition metal dichalcogenide, a transition metal trichalcogenide, or a combination thereof. The inorganic material is selected from TiS$_2$, TaS$_2$, MoS$_2$, NbSe$_3$, MnO$_2$, CoO$_2$, an iron oxide, a vanadium oxide, or a combination thereof.

The cathode active material layer may contain a metal oxide containing vanadium oxide selected from the group consisting of VO$_2$, Li$_x$VO$_2$, V$_2$O$_5$, Li$_x$V$_2$O$_5$, V$_3$O$_8$, Li$_x$V$_3$O$_8$, Li$_x$V$_3$O$_7$, V$_4$O$_9$, Li$_x$V$_4$O$_9$, V$_6$O$_{13}$, Li$_x$V$_6$O$_{13}$, their doped versions, their derivatives, and combinations thereof, wherein 0.1<x<5.

The cathode active material layer may contain a metal oxide or metal phosphate, selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), gamma-butyrolactone (gamma-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

There is no limitation on the type of electrolyte that can be used in the presently invented lithium-ion cell. The electrolyte may also be selected from gel electrolyte, polymer electrolyte, solid-state electrolyte, and ionic liquid electrolyte.

EXAMPLE 1

Anode Electrode Containing Amorphous Carbon-Protected Si Particles

Figure 2:
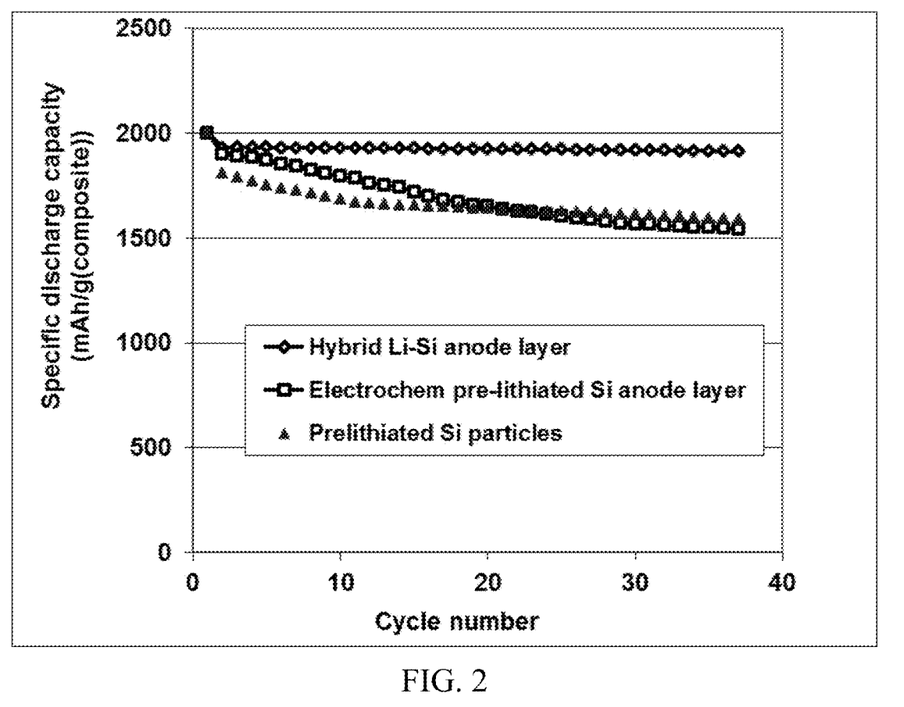
FIG. 2 Specific discharge capacities of three lithium-ion cells each having Si particles as the anode active material.

Summarized in FIG. 2 are the results of a study that illustrates the impressive advantages of the presently invented anode technology. There are three types of lithium-ion cells that were prepared, all based on $MoS_2$ as the cathode active material.

In the first cell (a control cell), the anode electrode was prepared by using slurry coating of prelithiated Si particles coated with amorphous carbon (13% after carbonization of phenolic resin) and bonded by PVDF (as the binder resin). The anode active material layer was coated on a Cu foil surface.

In the second cell (another control cell), the anode electrode was prepared by using slurry coating of Si particles coated with amorphous carbon (13% after carbonization of phenolic resin) and bonded by PVDF. Expanded graphite platelets were used as a conductive additive. After the anode active material layer was fabricated on a Cu foil surface, the layer was pre-lithiated electrochemically in an external electrochemical plating bath wherein a lithium metal foil was used as the counter electrode and $LiPF_6$-EC/PC as the electrolyte. After this external pre-lithiation procedure, the electrode was dried in a vacuum oven.

In the third cell, the anode electrode was prepared by using slurry coating of Si particles coated with amorphous carbon (13% after carbonization of phenolic resin) and bonded by PVDF. After the anode active material layer was fabricated on a Cu foil surface, the active material layer was subjected to physical vapor deposition of lithium that forms a layer of lithium metal coated on a primary surface of the anode active material layer. The resulting anode electrode, a porous separator (Celgard film), and a cathode layer were then laminated into a unit cell, packaged in an aluminum-plastic envelop, and injected with a liquid electrolyte ($LiPF_6$-EC/PC) to make a cell.

As illustrated in FIG. 2, the specific discharge capacity of the anode in each cell was designed as approximately 2,000 mAh per gram of (Si+C+expanded graphite+PVDF). These data indicate that the presently invented anode electrode delivers the highest first cycle efficiency (96.4%) and the most stable charge/discharge cycle behavior. After 37 cycles, this cell suffers a 0.8% capacity decay (from $2_{nd}$ cycle to $37^{th}$ cycle). The other two cells show a first cycle efficiency of 95% and 90%, respectively, and a capacity decay of 18% and 11%, respectively, after 37 cycles.

EXAMPLE 2

Anode Electrode Containing $Co_3O_4$ Particles

Figure 3:
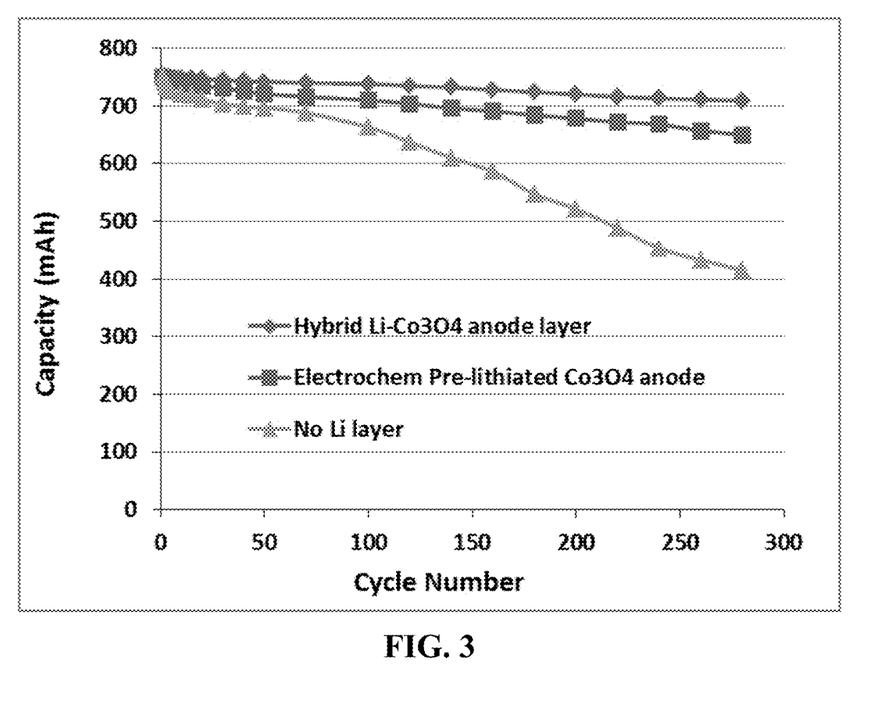
FIG. 3 Three pouch cells were designed and prepared to deliver a cell capacity of approximately 750 mAh: the first cell featuring a presently invented hybrid lithium film-anode active material layer electrode, second one featuring a electrochemically pre-lithiated anode layer, and a third cell containing a conventional anode without an extra layer of lithium metal and without pre-lithiation of the anode layer.

Three pouch cells were designed and prepared to deliver a cell capacity of approximately 750 mAh: the first cell featuring a presently invented hybrid lithium film-anode active material layer electrode, second one featuring a electrochemically pre-lithiated anode layer, and a third cell containing a conventional anode without an extra layer of lithium metal and without pre-lithiation of the anode layer. FIG. 3 shows that the presently invented lithium-ion cell featuring a hybrid anode electrode delivers the most stable charge/discharge cycling behavior.

EXAMPLE 3

Anode Electrode Containing Graphene-Encapsulated $SnO_2$ Particles

Figure 4:
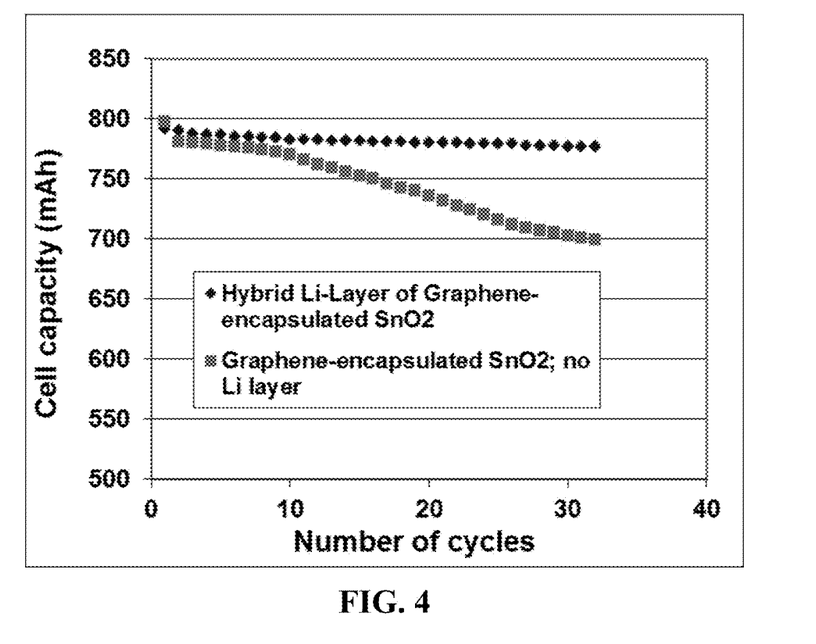
FIG. 4 The half-cell cycling behaviors of two Li-ion cells, each containing graphene-encapsulated $SnO_2$ particles as the anode active material; one cell containing a lithium metal layer deposited on a surface of the anode active material layer.

Graphene-encapsulated $SnO_2$ particles were supplied by Angstron Energy Co. (Dayton, Ohio). These particles, along with acetylene black (AB, as a conductive additive) and SBR (as a binder resin), were slurry-coated on a Cu foil surface to form two separate anode active material layers (50 μm thick). One such layer was deposited with a thin layer of lithium metal (1.5 μm thick), but the other layer without a lithium coating. The anode electrodes were then made into two cells each using lithium metal foil as a counter electrode. FIG. 4 shows the cycling behaviors of the two cells. These data again demonstrate the advantages of following the instant hybrid anode approach to preparing lithium-ion batteries. The instant cell exhibits significantly more stable charge/discharge behavior.

The invention claimed is:

1. A lithium-ion battery comprising a cathode, an anode, and an electrolyte in ionic contact with both the cathode and the anode, wherein, prior to said battery being assembled, the anode comprises (a) an anode active material layer composed of fine particles of a first anode active material having an average size from 1 nm to 10 μm, and (b) a layer of lithium metal or lithium metal alloy having greater than 50% by weight of lithium therein, wherein said layer of lithium metal or lithium metal alloy is in physical contact with the outer surface of said anode active material layer and provides from 1% to 120% of a required lithium storage capacity of said anode layer;
wherein said anode further comprises a protective material that forms a coating on a surface of said fine particles or forms a matrix in which said fine particles are dispersed.

2. The battery of claim 1, wherein lithium ions or atoms from said lithium metal or lithium metal alloy diffuse into said first anode active material particles to form lithiated anode particles after said battery is assembled and said anode is brought into contact with said electrolyte.

3. The battery of claim 1, wherein said anode active material layer or the layer of lithium metal or lithium metal alloy further contains an amount of electrolyte.

4. The battery of claim 1, wherein said first anode active material particles have an average particle size from 1 nm to 1 μm.

5. The battery of claim 1, wherein first anode active material particles have an average particle size from 1 nm to 100 nm.

6. The battery of claim 1, wherein said first anode active material is selected from the group consisting of: (a) silicon (Si), germanium (Ge), tin (Sn), lead (Pb), antimony (Sb), bismuth (Bi), zinc (Zn), aluminum (Al), and cadmium (Cd); (b) alloys or intermetallic compounds of Si, Ge, Sn, Pb, Sb, Bi, Zn, Al, or Cd with other elements, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, or Cd, and their mixtures or composites; and (d) combinations thereof.

7. The battery of claim 2, wherein said lithiated anode particles comprise a lithiated silicon having a chemical formula of $Li_4Si$, $Li_{4.4}Si$, or $Li_xSi$, wherein $0.02 \leq x \leq 4.4$.

8. The battery of claim 1, wherein said anode active material comprises a doped semiconductor material selected from Si or Ge doped with n-type and/or p-type dopants.

9. The battery of claim 1, wherein said anode active material layer contains a binder that is porous having a porosity level from 1% to 90%.

10. The battery of claim 1, wherein said anode active material layer is porous having a porosity level from 1% to 50%.

11. The battery of claim 1, wherein said anode active material layer contains a binder that is an elastomer having a recoverable tensile elastic deformation from 2% to 700%.

12. The battery of claim 1, wherein said anode further comprises an amorphous carbon or polymeric carbon that forms a coating on a surface of said fine particles or forms a matrix in which said fine particles are dispersed.

13. The battery of claim 12, wherein said carbon coating has a thickness less than 1 μm.

14. The battery of claim 12, wherein said carbon is obtained from pyrolization of a polymer, pitch, or organic precursor, or obtained by chemical vapor deposition.

15. The battery of claim 1, wherein said protective material is selected from graphene, an electron-conducting polymer, an ion-conducting polymer, a carbon coating, or a combination thereof.

16. The battery of claim 1, wherein said anode further comprises a second anode active material selected from particles of graphite, hard carbon, soft carbon, meso-carbon micro-bead, surface-modified graphite, carbon-coated graphite, or a combination thereof.

17. The battery of claim 1, wherein said anode comprises a conductive additive selected from the group consisting of carbon black, electro-spun nanofibers, carbonized electro-spun nanofibers, vapor-grown carbon or graphite nanofibers, carbon or graphite whiskers, carbon nanotubes, nanoscaled graphene platelets, metal nanowires, metal-coated nanowires, carbon-coated nanowires, metal-coated nanofibers, carbon-coated nanofibers, and combinations thereof.

18. The battery of claim 1, wherein said cathode does not contain a full capacity of lithium initially when the battery is assembled.

19. The battery of claim 1, wherein said cathode does not contain lithium initially when the battery is assembled.

20. The battery of claim 1, wherein said anode active layer is supported by or bonded to an anode current collector.

21. The battery of claim 1, wherein said electrolyte is selected from organic liquid electrolyte, ionic liquid electrolyte, gel electrolyte, polymer electrolyte, solid-state electrolyte, or a combination thereof.

22. An anode electrode layer for a lithium-ion battery, said anode electrode layer comprising (a) an anode active material layer comprising fine particles of a first anode active material having an average size from 1 nm to 10 μm, and (b) a layer of lithium metal or lithium metal alloy having greater than 50% by weight of lithium therein, wherein said layer of lithium metal or lithium metal alloy is in physical contact with the outer surface of said anode active material layer;
wherein said first anode active material is selected from the group consisting of: (a) silicon (Si), germanium (Ge), tin (Sn), lead (Pb), antimony (Sb), bismuth (Bi), zinc (Zn), aluminum (Al), and cadmium (Cd); (b) alloys or intermetallic compounds of Si, Ge, Sn, Pb, Sb, Bi, Zn, Al, or Cd with other elements, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, or Cd, and their mixtures or composites; and (d) combinations thereof;
wherein said anode further includes a desired amount of a second anode active material selected from particles of graphite, hard carbon, soft carbon, meso-carbon micro-bead, surface-modified graphite, carbon-coated graphite, or a combination thereof.

23. The anode electrode layer of claim 22, further comprising an anode current collector wherein said anode active layer is supported by or bonded to said anode current collector.

24. The anode electrode layer of claim 22, wherein said anode active layer or the layer of lithium metal or lithium metal alloy further contains an amount of electrolyte or lithium ion-conducting liquid.

25. The anode electrode layer of claim 24, wherein said electrolyte is selected from organic liquid electrolyte, ionic liquid electrolyte, gel electrolyte, polymer electrolyte, solid-state electrolyte, or a combination thereof.

26. The anode electrode layer of claim 22, further comprising a protective film that covers said layer of lithium metal or lithium metal alloy.

27. The anode electrode layer of claim 22, wherein said first anode active material particles have an average particle size from 1 nm to 1 µm.

28. The anode electrode layer of claim 22, wherein first anode active material particles have an average particle size from 1 nm to 100 nm.

29. The anode electrode layer of claim 22, wherein said anode further comprises an amorphous carbon or polymeric carbon that forms a coating on a surface of said fine particles or form a matrix in which said fine particles are dispersed.

30. The anode electrode layer of claim 29, wherein said amorphous or polymeric carbon coating has a thickness less than 1 µm.

31. The anode electrode layer of claim 29, wherein said amorphous or polymeric carbon is obtained from pyrolization of a polymer, pitch, or organic precursor, or obtained by chemical vapor deposition.

32. The anode electrode layer of claim 22, wherein said anode active layer further comprises a protective material that forms a coating on a surface of said fine particles or form a matrix in which said fine particles are dispersed.

33. The anode electrode layer of claim 32, wherein said protective material is selected from graphene, an electron-conducting polymer, an ion-conducting polymer, a carbon coating, or a combination thereof.

34. The anode electrode layer of claim 22, wherein said anode comprises a conductive additive is in a form of a porous mat, fabric, paper, or foam of carbon/graphite fibers, carbon nanotubes, graphene sheets, expanded graphite flakes, metal nanowires, or a combination thereof.

35. The anode electrode layer of claim 22, wherein said anode comprises a conductive additive selected from the group consisting of carbon black, electro-spun nanofibers, carbonized electro-spun nanofibers, vapor-grown carbon or graphite nanofibers, carbon or graphite whiskers, carbon nanotubes, graphene sheets, metal nanowires, metal-coated nanowires, carbon-coated nanowires, metal-coated nanofibers, carbon-coated nanofibers, and combinations thereof.

36. The anode electrode layer of claim 22, wherein said anode active layer further comprises a porous separator layer that protects said lithium metal or lithium metal alloy layer.

37. A process for producing the anode electrode layer of claim 22, comprising (a) preparing an anode active material layer composed of said fine particles of a first anode active material having an average size from 1 nm to 10 µm, a conductive additive, and an optional binder that bonds said fine particles and said conductive additive together to form said anode active material layer of structural integrity and (b) depositing a layer of lithium metal or lithium metal alloy onto a surface of said anode active material layer to form said anode electrode.

38. The process of claim 37, wherein said step of preparing said anode active material layer comprises forming said conductive additive into a conductive foam and incorporating said fine particles of said first anode active material into pores of said conductive foam.

39. The process of claim 38, wherein said conductive foam contains a conductive material selected from the group consisting of carbon black, electro-spun nanofibers, carbonized electro-spun nanofibers, vapor-grown carbon or graphite nanofibers, carbon or graphite whiskers, carbon nanotubes, graphene sheets, metal nanowires, metal-coated nanowires, carbon-coated nanowires, metal-coated nanofibers, carbon-coated nanofibers, and combinations thereof.

40. The process of claim 38, wherein said conductive foam is selected from carbon foam, graphite foam, or graphene foam.

41. The process of claim 37, wherein said step of preparing said anode active material layer comprises coating one layer of said anode active material onto at least one primary surface of an anode current collector.

42. The process of claim 37, wherein said step of depositing a layer of lithium metal or lithium metal alloy onto a surface of said anode active material layer is conducted with a process selected from physical vapor deposition, chemical vapor deposition, sputtering, laser ablation deposition, or electrochemical deposition.

43. An anode electrode layer for a lithium-ion battery, said anode electrode layer comprising:
(a) an anode active material layer composed of fine particles of a first anode active material having an average size from 1 nm to 10 µm, wherein said layer includes pores therein; and
(b) a layer of lithium metal or lithium metal alloy having greater than 50% by weight of lithium therein, wherein said layer of lithium metal or lithium metal alloy is in physical contact with the outer surface of said anode active material layer;
wherein said layer of lithium metal or lithium metal alloy is in physical contact with said anode active material layer and provides from 1% to 120% of a required lithium storage capacity of said anode layer;
wherein during lithiation of the anode electrode layer, the anode active material layer receives lithium ions, causing the fine particles of first anode active material to expand and the layer of lithium metal or lithium metal alloy to thin;
wherein the expansion of the fine particles of first anode active material is accommodated by at least one of the pores and the thinning of the layer of lithium metal or lithium metal alloy.

* * * * *